(12) United States Patent
Schroeder et al.

(10) Patent No.: US 6,296,301 B1
(45) Date of Patent: Oct. 2, 2001

(54) MOTOR VEHICLE BODY STRUCTURE USING A WOVEN FIBER

(75) Inventors: Del C. Schroeder, Bloomfield Hills; John G. Argeropoulos, Sterling Heights; Russell C. Fielding, Clarkston, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/468,672

(22) Filed: Dec. 21, 1999

(51) Int. Cl.[7] .................................................. B60K 27/00
(52) U.S. Cl. ................... 296/193; 296/197; 296/203.01; 296/188; 296/210
(58) Field of Search ..................................... 296/193, 197, 296/203.01, 203.03, 701, 187, 188, 146.6, 210

(56) References Cited

U.S. PATENT DOCUMENTS

| | | |
|---|---|---|
| 3,868,141 | 2/1975 | Johnson . |
| 3,894,608 | 7/1975 | Haenle . |
| 4,290,235 | 9/1981 | Jahnle et al. . |
| 4,320,160 | 3/1982 | Nishimura et al. . |
| 4,369,608 * | 1/1983 | Miura et al. .................. 296/146.6 X |
| 4,378,394 * | 3/1983 | Miura et al. ..................... 296/188 X |
| 4,382,626 | 5/1983 | Spooner . |
| 4,601,367 | 7/1986 | Bongers . |
| 4,732,803 | 3/1988 | Smith, Jr. . |
| 4,742,899 | 5/1988 | Thornton . |
| 4,863,771 * | 9/1989 | Freeman ........................... 296/187 X |
| 5,046,778 | 9/1991 | Larsen . |
| 5,047,281 | 9/1991 | Betz et al. . |
| 5,344,689 | 9/1994 | Ide et al. . |
| 5,403,062 * | 4/1995 | Sjostedt et al. ....................... 296/181 |
| 5,480,208 * | 1/1996 | Cobes et al. ..................... 296/187 X |
| 5,531,500 | 7/1996 | Podvin . |
| 5,552,208 | 9/1996 | Lin et al. . |
| 5,660,427 | 8/1997 | Freeman et al. . |
| 5,690,378 * | 11/1997 | Romesburg ...................... 296/197 X |
| 5,704,644 | 1/1998 | Jaggi . |
| 5,857,732 | 1/1999 | Ritchie . |
| 5,934,737 * | 8/1999 | Abouzahr ............................. 296/188 |
| 5,934,745 | 8/1999 | Moore et al. . |
| 6,003,936 * | 12/1999 | Gordon ........................... 296/210 X |
| 6,206,458 * | 3/2001 | Schroeder et al. .................... 296/193 |

FOREIGN PATENT DOCUMENTS

2698601-A1 * 6/1994 (FR) ..................................... 296/197

* cited by examiner

Primary Examiner—Joseph D. Pape
Assistant Examiner—Jason Morrow
(74) Attorney, Agent, or Firm—Mark P. Calcaterra

(57) ABSTRACT

A motor vehicle body including inner and outer body panels. The inner body panel and the outer body panel form at least one cavity therebetween. A structural cross woven fiber material is applied to the cavity formed between the inner and outer body panels in order to increase rigidity of the motor vehicle body. The cross woven or unidirectional fiber is fiberglass carbon fiber or other structural fibers which, in combination with resin (in fiber or powder form), becomes an integral part of the motor vehicle body structure when heat is applied.

11 Claims, 4 Drawing Sheets

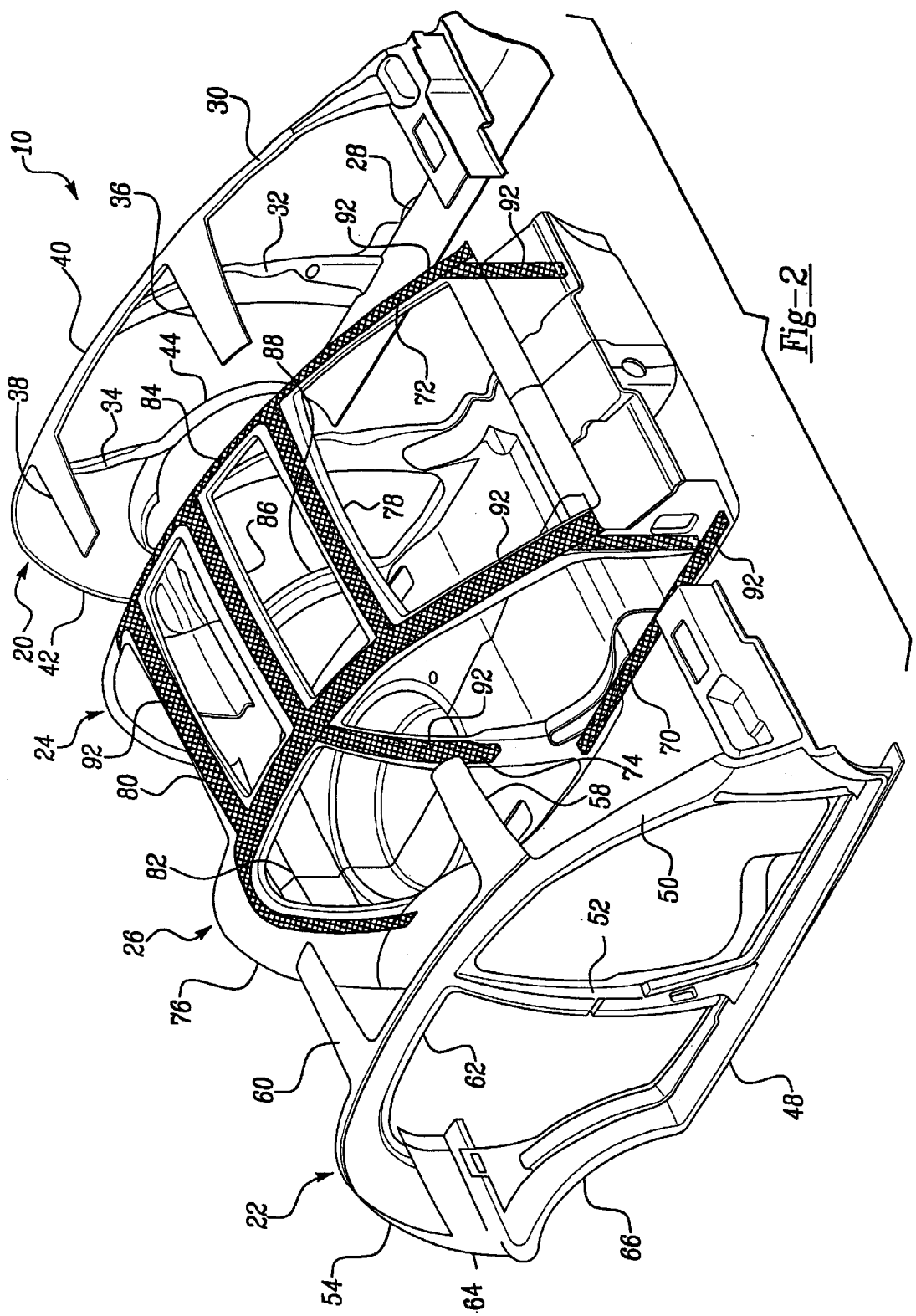

MOTOR VEHICLE BODY STRUCTURE USING A WOVEN FIBER

FIELD OF THE INVENTION

The present invention relates generally to a motor vehicle body structure, and more particularly, to a reinforced motor vehicle body structure using a woven fiber of simple and lightweight construction.

BACKGROUND

As traffic congestion increases with the population growth, the inherent risk of traffic accidents has escalated, and a safer motor vehicle has been a long time demand. Consequently, many different types of safety features have been introduced and developed such as airbags and seat belts. In addition, automobile manufacturers are in search of ways to enhance the rigidity of the motor vehicle body panels in order to absorb more impact in the event of a collision without increasing vehicle length, width, or weight.

Conventional motor vehicle body supporting structures employ a structure having full-width cavities between the inner and the outer body panels. For example, plastically deformable impact regions are enclosed between the inner and the outer body panels, so that deformable regions can expand when pressure is applied. However, full-width cavities between body panels do not enhance the rigidity of the motor vehicle body structure and are capable of only limited support.

Another example of motor vehicle supporting structures is to assemble the outer body panel with more than one inner body panel, so that the rigidity of the motor vehicle body is enhanced. However, the use of multiple body panels increases the manufacturing process steps, and manufacturing cost as well as the weight of the motor vehicle.

It is, therefore, one object of the present invention to provide a motor vehicle body structure which enhances the rigidity of the vehicle structure, so that it is capable of absorbing more impact in case of a collision, and to also provide the desired bend and torsional loads for vehicle ride and handling performance.

It is another object of the present invention to provide a motor vehicle body structure that is lightweight, is low cost, and is easy to assemble.

SUMMARY OF THE INVENTION

The present invention overcomes the aforementioned disadvantages as well as other disadvantages. In accordance with the teachings of the present invention, a woven fiber material including a cross woven or unidirectional or a combination of weaves, mats, or other fiber products is enclosed between the inner and the outer body panels for increasing the rigidity of the structure. The cross woven (or unidirectional or a combination thereof) fiber material includes strands of fibers woven with resin in fiber or powder form and is disposed in a predetermined cavity between the inner and the outer body panels. The cross woven or unidirectional fiber material is heated with hot air in order to melt the resin and bond directly to the body panels, and is then cooled down. Once the resin is cooled, the cross woven or unidirectional fiber material becomes a very stiff integral part fused to the primary body panels of the motor vehicle body structure. The present invention provides a vehicle body reinforcement method which requires fewer manufacturing steps, less manufacturing cost, and is lighter in weight than conventional reinforcement methods.

The present invention is applicable to any type of body panels whether composite plastic or steel. However, the detailed description of the preferred embodiment will introduce a particular application of a cross woven fiber material for reinforcement of a composite plastic motor vehicle body structure. The use of cross woven fiber material is not limited to any particular parts, but can be applied to various parts of the motor vehicle body structure such as doors, pillars, roof, and body panels. Also included are chassis components such as frames, cross members, and suspension parts.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2 is an exploded view depicting the four plastic body panels with cross woven fiber materials applied to various parts of the motor vehicle body structure in the preferred embodiment of the present invention;

DETAILED DESCRIPTION OF THE PREFERRED EMBODIMENT

Figure 1:
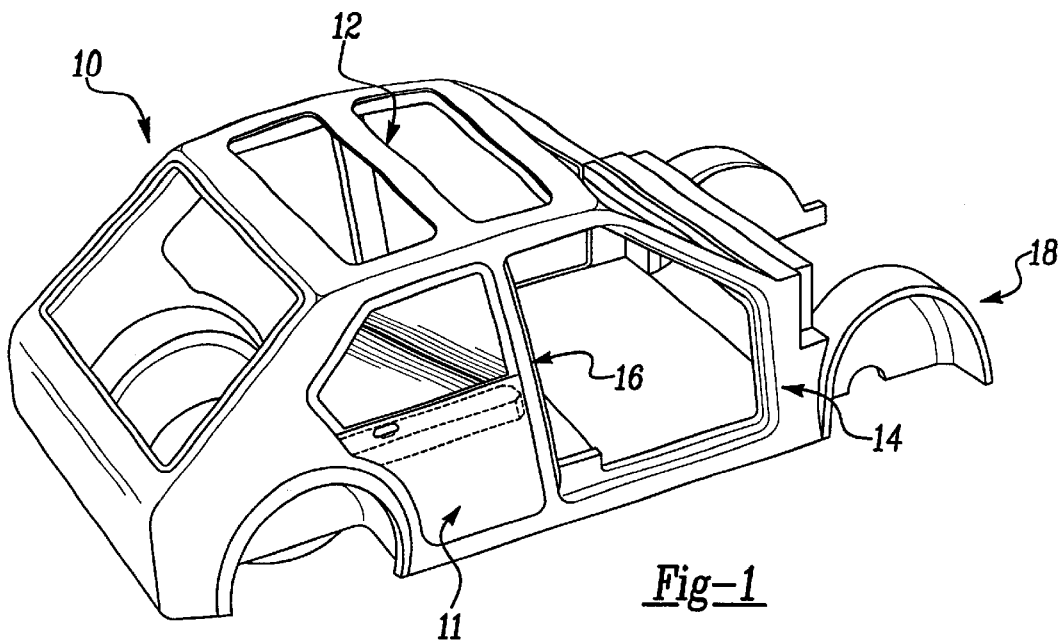
FIG. 1 is a perspective view depicting the motor vehicle body structure of the present invention.

Referring to FIG. 1, a motor vehicle body structure 10 is shown. The motor vehicle body structure 10 is provided with structural support in predetermined locations by a cross woven fiber material according to the principles of the present invention as described below. The motor vehicle body parts where the structural support can be applied, include doors 11, door aperture 14, pillar members 16, header members 12, wheel housing members 18, and other panel members as well. A particular application of the aforementioned supporting structure for a composite plastic motor vehicle body with four body panels will be described in greater detail hereinafter.

With particular reference to FIG. 2 of the drawings, a composite plastic motor vehicle body 10 is shown. The plastic motor vehicle body 10 may comprise four body panels, which are left-hand outer body panel 20, right-hand outer body panel 22, left-hand inner body panel 24, and right-hand inner body panel 26. The four body panels may be secured together at the centerline of the plastic motor vehicle body 10. A similar body structure is disclosed in commonly assigned U.S. Pat. No. 5,934,745 which is herein incorporated by reference.

Left-hand outer body panel 20 has a generally vertical side which includes door aperture member 28, "A" pillar member 30, "B" pillar member 32, and "C" pillar member 34. Door frame member 28 also include frames for windows. Left-hand outer body panel 20 also comprises horizontal appendages which include left-hand outer (LHO) front header member 36, and LHO rear header member 38, LHO roof frame member 40, and back panel member 42. Left-hand outer body panel 20 also includes a wheel housing 44.

Right-hand outer body panel 22 is basically the mirror image of the left-hand outer body panel 20. Right-hand outer body panel 22 has a generally vertical side which includes door aperture member 48, "A" pillar member 50, "B" pillar member 52, and "C" pillar member 54. Door frame member 48 also include frames for windows. Right-hand outer body panel 22 also comprises horizontal appendages which include right-hand outer (RHO) front header member 58, and RHO rear header member 60, RHO roof frame member 62, and back panel member 64. Right-hand outer body panel 22 also includes a wheel housing 66.

Left-hand inner body panel 22 and right-hand inner body panel 26 are secured together at the centerline of the motor vehicle body 10. The inner body panels 24 and 26 also have generally vertical parts and horizontal parts. Vertical parts include "A" pillar members 72, "B" pillar members 74, and "C" pillar members 76. Horizontal parts of the inner body panels 24 and 26 include door aperture frame members 70, inner front header members 78, and inner rear header members 80, inner mid-header members 82, inner roof frame members 84, and inner back panel members 86. Inner body panels 24 and 26 also include inner wheel housings 88.

When the left-hand inner body panel 24 is connected to the right-hand inner body panel 26, the horizontal parts of the inner body panels extend from generally vertical parts of one inner body panel to the other. The inner body panels are then secured to the outer body panels 20, 22 by using adhesive or injection molded plastic components, to form motor vehicle body 10 of FIG. 1.

The inner body panels 24, 26 and the outer body panels 20, 22 have slightly different configurations, so that they can be secured at the edges, yet form hollow cavities 96 between the inner 24, 26 and the outer 20, 22 body panels. As it will be described in detail with particular reference to FIG. 3, a cross woven fiber material 92 is inserted into the aforementioned cavities 96 between the inner and the outer body panels with a heat meltable resin material meshed therewith. After the fiber material is inserted, heat is applied in order to create a bond between the resin on the cross woven fibers and the body panel, which form a motor vehicle body structural support.

Figure 3:
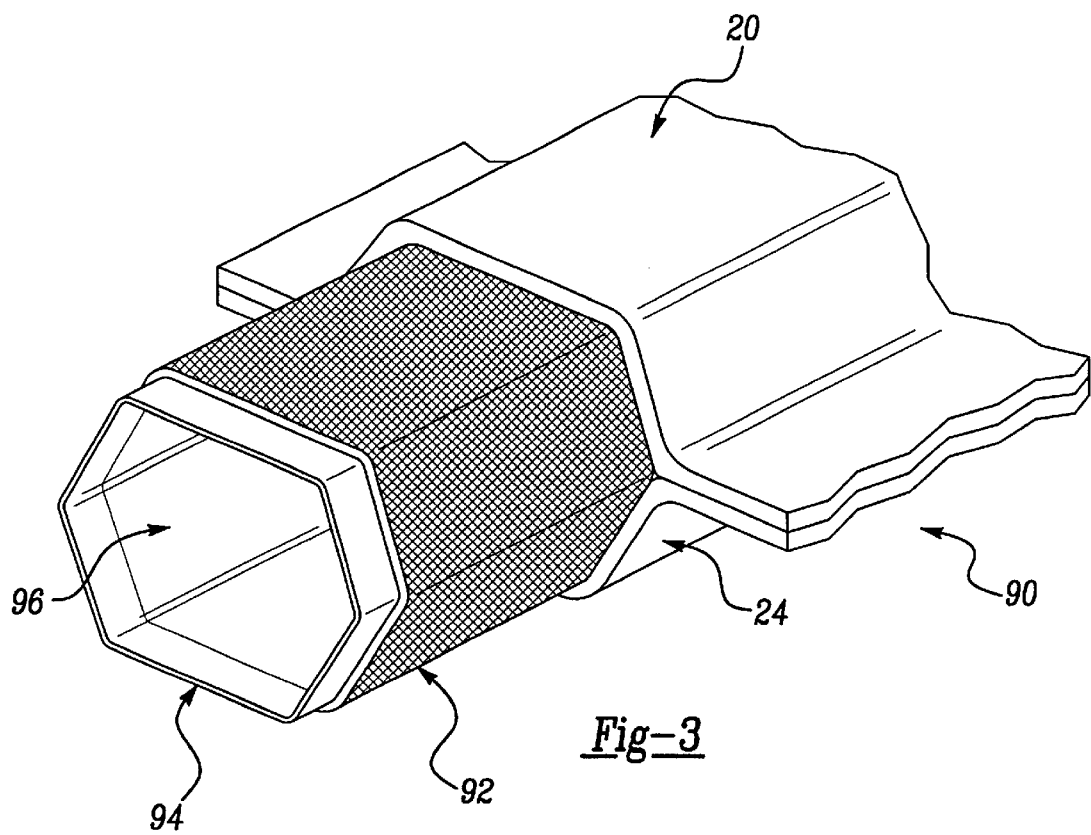
FIG. 3 is an exploded view depicting the cross woven fiber material enclosed between inner and the outer body panels according to the principles of the present invention.

FIG. 3 shows a motor vehicle body structural support 90 using a cross woven fiber material 92. The cross woven fiber can be chosen from carbon and graphite fibers, metal, cotton, or carbon based fibers. In a preferred embodiment, the cross woven material 92 is a thermoplastic roving consisting of commingled unidirectional thermoplastic and fiberglass or carbon fibers as a reinforced structure. A preferred commercially available material is available under the trade name TWINTEX, available from Vetrotex, Gross Point Farms, Minn. The filaments of the fiber material are cross woven continuously with a thermoplastic resin with narrow weave angles over a fixed mandrel, so that the cross woven fiber material 92 resembles a basket weave on a Chinese finger pull. The resin is a heat meltable polypropylene material or other plastic material in both fiber and powdered form which is used to bond the filaments of the fiber material (along with the internal polypropylene tube), and the fiber material with the body panels together when heat is applied by providing air retention during the initial blow of the body contour forming process. In this preferred embodiment, both polypropylene or other plastic fiber and powder can be used for the thermoplastic resin, on the filaments of the fiber material.

The unidirectional cross woven fiber 92 along with polypropylene is formed as a thin wall flexible tube 94 and is then placed in the aforementioned cavities 96 enclosed between the inner 24 and the outer 20 body panels, for example. After placing the cross woven fiber material 92 in the cavity 96, hot air or steam is applied to melt the resin thereby causing the fiber material to take the shape of the cavity which contains it. The resin diffuses into the filaments of the fiber material 92, thereby bonding the entire cross woven fiber material 92 to the motor vehicle body panels 24 and 20. When the cross woven fiber is cooled down to an appropriate temperature range, it becomes an integral part of the motor vehicle body structure 10.

Referring back to FIG. 2, the reinforcing cross woven fiber material 92 is applied continuously to "A" pillar member 72, "B" pillar member 74, "C" pillar member 76, door sills 70, front header member 78, mid header member 86, rear header member 80, and roof frame member 84. When inner body panels 24 and 26 and outer body panels 20 and 22 are assembled together, they form cavities 96, so that the reinforcing cross woven fiber material 92 in combination with polypropylene are embodied within the inner body panel surface of cavity 96. With the aforementioned heating method, the reinforcing cross woven fiber material 92 becomes an integral part of the motor vehicle body 10 when heat is applied.

With this application, some applied reinforced cross woven fiber components would require specified ends to be restricted or closed off.

Figure 4:
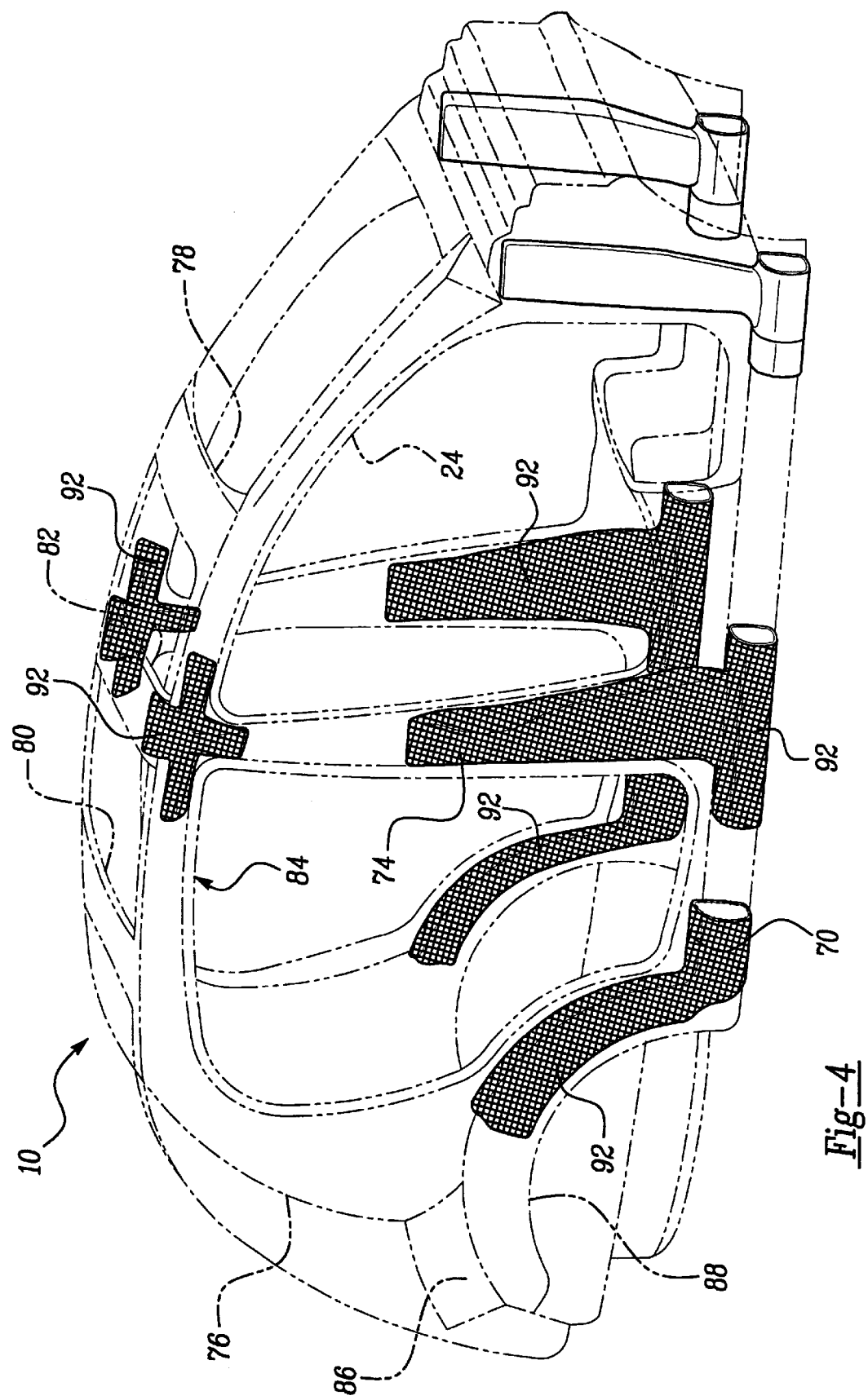
FIG. 4 is a side view depicting the motor vehicle body structure using the cross woven fiber material in various joint locations.

FIG. 4 is a side view depicting an alternative pattern for placement of the reinforcing cross woven fiber material 92. In this preferred embodiment, the reinforcing cross woven fiber material 92 is applied in various joint locations around the motor vehicle body structure 10. The various joint locations include joints between wheel housing members 88 and door frames 70, "B" pillar members 74 and door frames 70, and joints where roof frame members 84, the mid header member 82 and "B" pillar members 74 intersect. The reinforcing cross woven fiber material 92 is applied over extended areas around various joint locations in order to further reinforce the motor vehicle body 10. Once again, the reinforcing cross woven fiber material 92 becomes an integral part of the motor vehicle body 10 when heat is applied with the aforementioned method.

Figure 5:
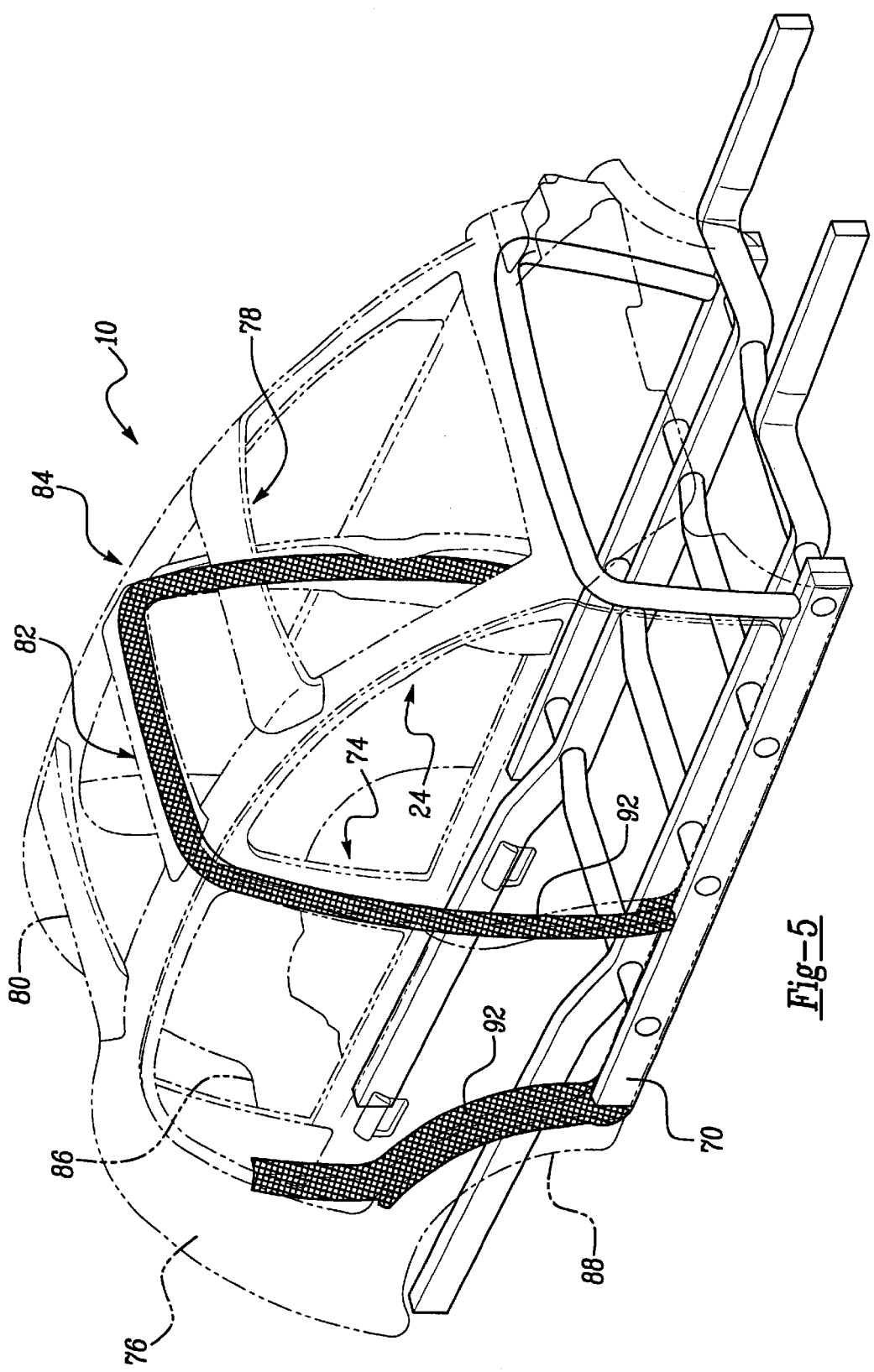
FIG. 5 is a perspective view depicting the motor vehicle body structure using the cross woven fiber material in an alternative pattern for reinforcing the motor vehicle body structure.

FIG. 5 shows another embodiment of the present invention where the reinforcing cross woven fiber material 92 is applied to the motor vehicle body structure 10 in an alternative pattern. In this preferred embodiment, the reinforcing cross woven fiber material 92 is applied as a continuous structure around the "B" pillar member 74 and the mid header member 82, and around the joint between the "C" pillar member 76 and the wheel housing member 88.

The present invention allows for placement of structural fibers within a plastic or steel motor vehicle body structure in order to increase the rigidity of the body structure. The placement of the reinforcing cross woven fiber material 92 is not limited to one embodiment of the present invention, but it can be applied in combination of one embodiment with other embodiments as needed. The cross woven fiber material 92 is also rate sensitive, so that it is capable of absorbing more energy in case of a collision. Therefore, the present invention provides an enhancement in the safety of the motor vehicle body structure with lower manufacturing cost, easier and less manufacturing process steps, and lighter weight than conventional reinforcement methods. Various other advantages of the present invention will become apparent to those skilled in the art after having the benefit of studying the foregoing text and drawing taken in conjunction with the following claims.

What is claimed is:

1. A motor vehicle body structure, comprising:

an outer body panel;

an inner body panel mounted to said outer body panel and forming at least one cavity therebetween; and a structural fiber material applied to said cavity to enhance rigidity of the motor vehicle body wherein the structural fiber material is a cross-weaver of unidirectional structural fiber which is selected from the group of carbon and graphite fibers, metal, cotton, carbon based fibers and combinations thereof, wherein the structural supporting fiber material further comprises multiple filaments cross woven with a narrow weave angle.

2. The structure of claim 1 wherein the structural supporting fiber material is combined with the heat meltable resin.

3. The structure of claim 2 wherein the structural supporting fiber material in combination with the heat meltable resin becomes an integral part of the motor vehicle body structure when heat is applied.

4. The structure of claim 1 wherein the body structure is a door.

5. The structure of claim 1 wherein the body structure is pillar member.

6. The structure of claim 1 wherein the body structure is a roof.

7. The structure of claim 1 wherein the body structure is a door frame.

8. A motor vehicle body, comprising;

a left-hand outer body panel;

a left-hand inner body panel;

a right-hand outer body panel;

a right-hand inner body panel;

the four body panels being capable of being secured together to form a motor vehicle body having a longitudinal midline, the four body panels being securable together at the longitudinal midline of the motor vehicle body;

the two inner body panels and the two outer body panels forming at least one cavity therebetween; and the supporting woven fiber material disposed in the cavity, and combined to form an integral part of the motor vehicle body when heat is applied to provide structural support to the four body panels, thereby increasing the rigidity.

9. The body of claim 8 wherein the supporting woven fiber material is a cross weave of unidirectional structural fiber, which is selected from the group of carbon and graphite fibers, metal, cotton, carbon based fibers, and combinations of thereof.

10. The body of claim 9 wherein the supporting woven fiber material is combined with a heat meltable binding resin.

11. The body of claim 9 wherein the supporting woven fiber further comprises multiple filaments cross woven with a narrow weave angle.

* * * * *